Figure 1:
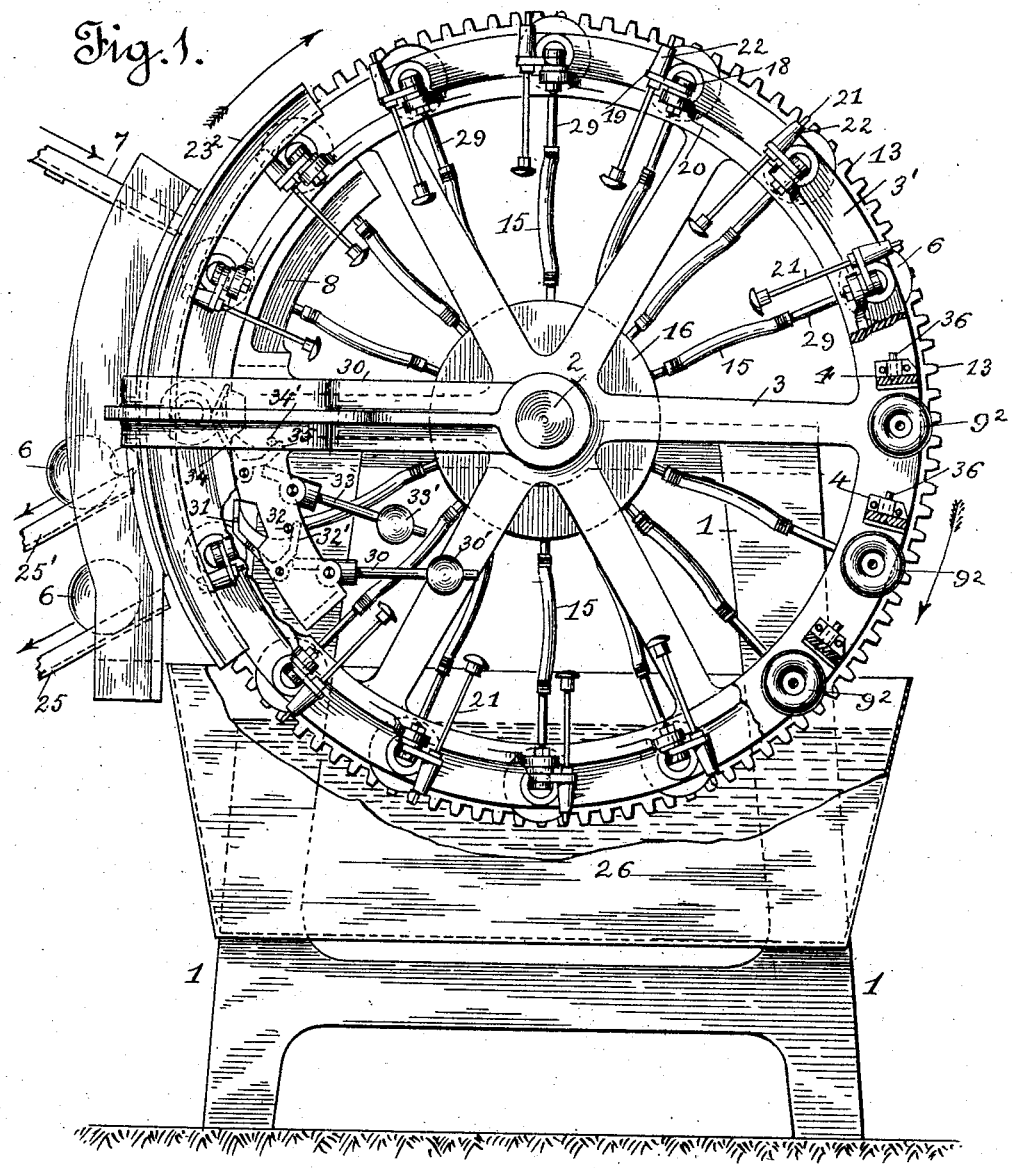

No. 786,404. PATENTED APR. 4, 1905.
H. C. BLACK.
CAN TESTING APPARATUS.
APPLICATION FILED OCT. 12, 1903.

3 SHEETS—SHEET 1.

Witnesses.

Inventor.
Henry C. Black
by N. A. Acker
his atty.

No. 786,404.
PATENTED APR. 4, 1905.
H. C. BLACK.
CAN TESTING APPARATUS.
APPLICATION FILED OCT. 12, 1903.
3 SHEETS—SHEET 2.
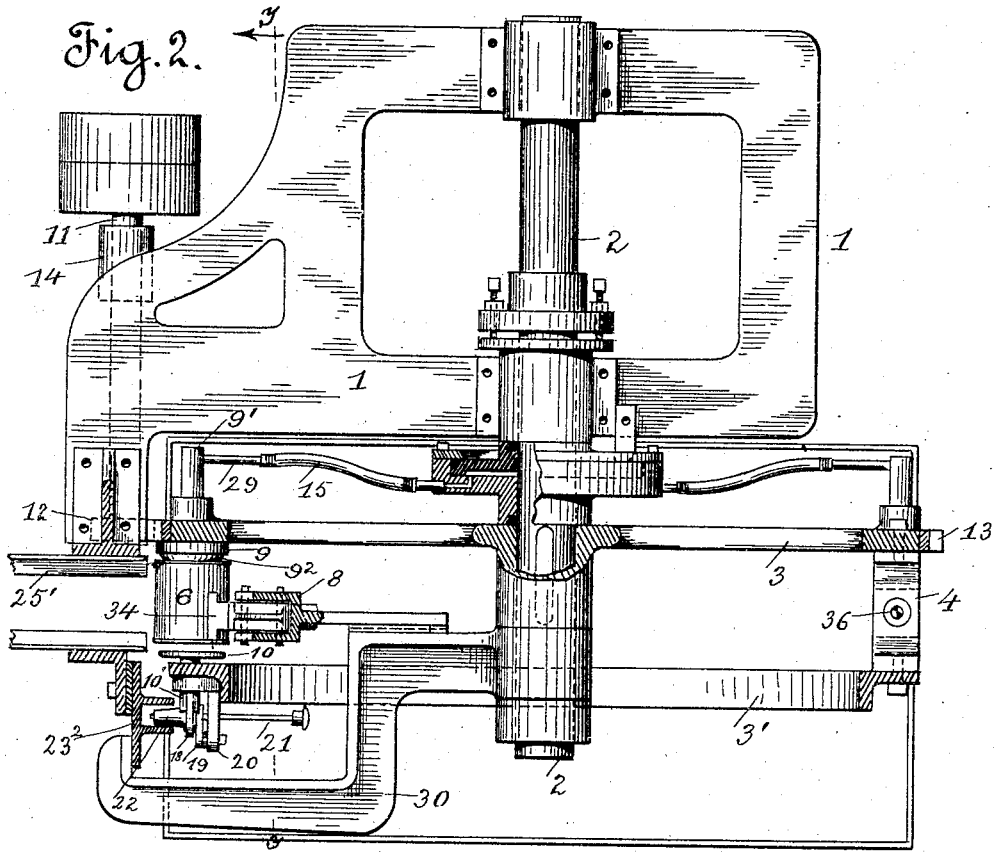
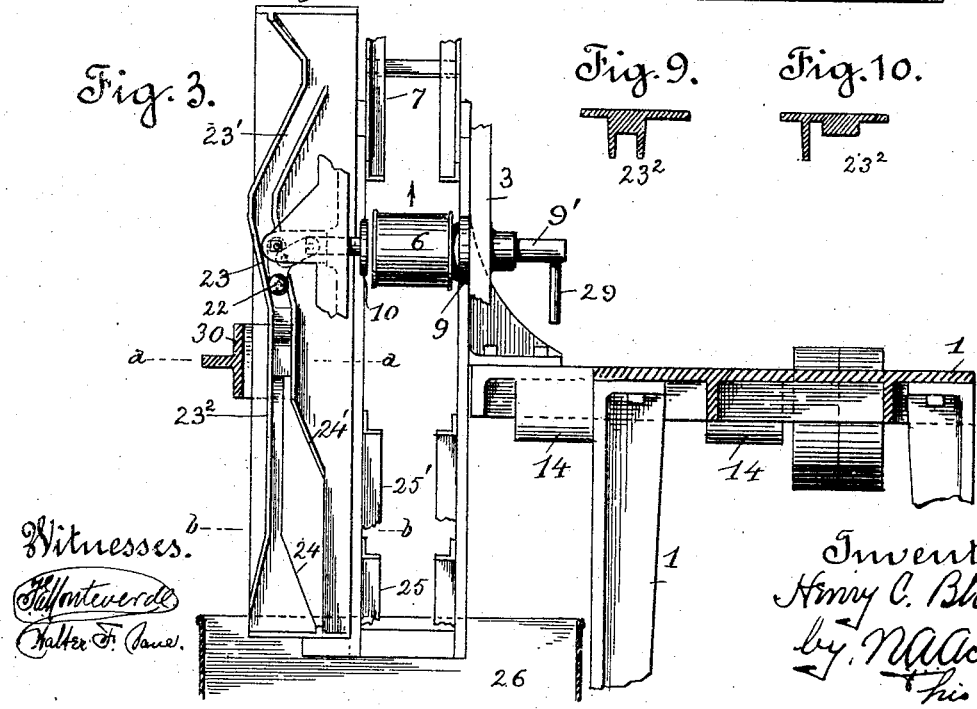
Witnesses.
H. Monteverde
Walter F. Pane
Inventor.
Henry C. Black
by N. A. Acker
his Atty

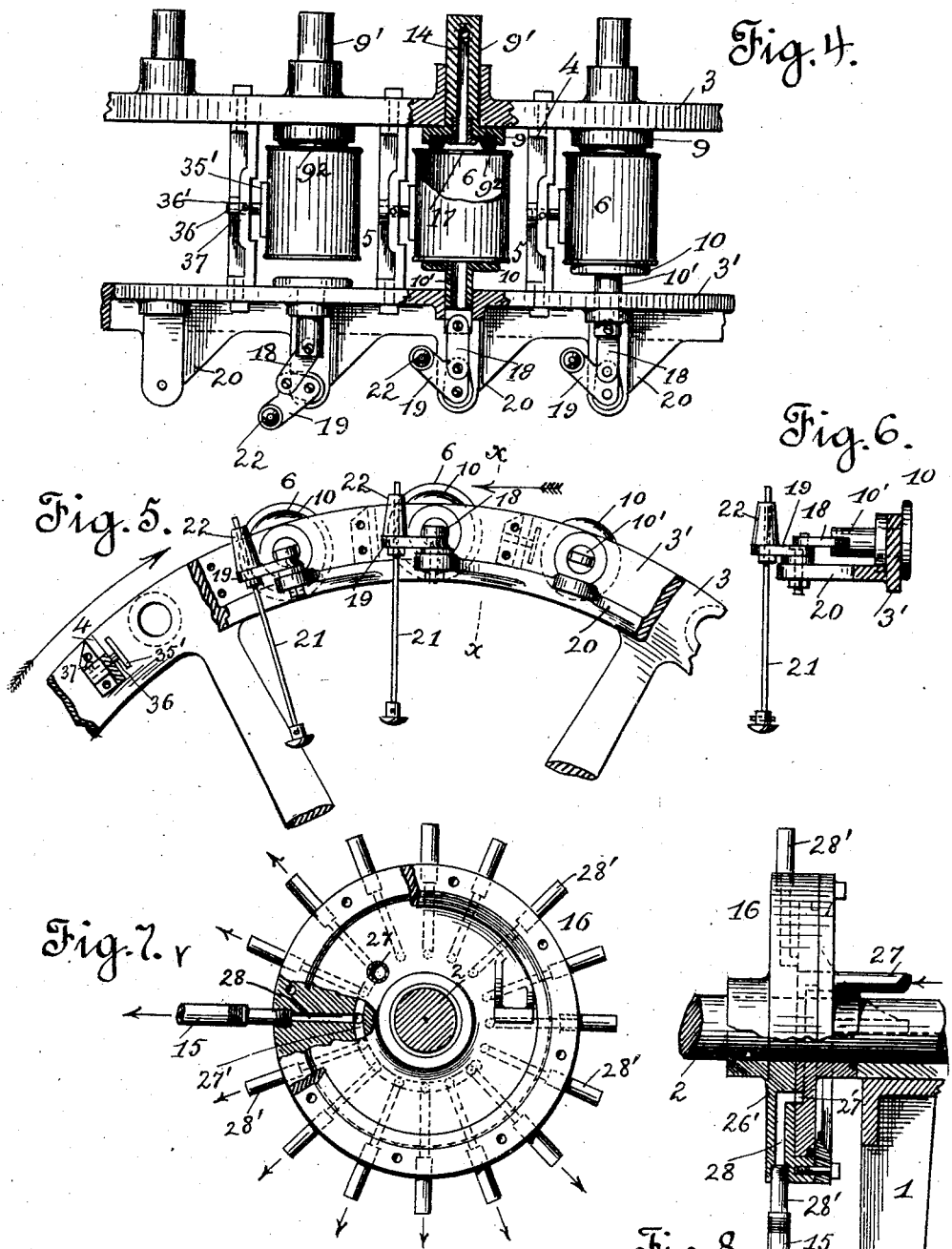

No. 786,404.

Patented April 4, 1905.

UNITED STATES PATENT OFFICE.

HENRY C. BLACK, OF SAN FRANCISCO, CALIFORNIA.

CAN-TESTING APPARATUS.

SPECIFICATION forming part of Letters Patent No. 786,404, dated April 4, 1905.

Application filed October 12, 1903. Serial No. 176,723.

*To all whom it may concern:*

Be it known that I, HENRY C. BLACK, a citizen of the United States, residing in the city and county of San Francisco, State of California, have invented certain new and useful Improvements in Can-Testing Apparatus; and I do hereby declare the following to be a full, clear, and exact description of the same.

The present invention relates to certain improvements in connection with that class of can-testing machines known as "dip-testers," or such wherein the cans to be tested are filled with air under pressure and then immersed within a liquid bath for the detection of imperfect cans as conveyed through the said bath, the invention residing more particularly in the improved construction of the clamping mechanism for the cans and means for releasing the tested can from within its seat; also, in the devices for automatically ejecting the tested can from its seat and discharging the same respectively into the runways or chutes for the perfect and for the imperfect tested cans.

To comprehend the invention, reference should be had to the accompanying sheets of drawings, wherein—

Figure 1 is a side view in elevation of the apparatus, the tester-tank and the can-carrier being partly broken away, said view disclosing the runways or chutes for the perfect and for the imperfect cans, also the feed-chute or runway for delivering the cans to be tested to the can-carrier, the supporting-plate for holding the loose cans within the can-seats being partly broken away in order to disclose the ejector for the imperfect or defective cans. Fig. 2 is a top plan view of the apparatus, the can-carrier being in section and the air-distributing means being in part section, one pair of can-clamps being illustrated as opened and the can within the seat of the can-carrier in position to be discharged into the runway for the perfect cans. Fig. 3 is a vertical cross-sectional end view taken on line *y y* of Fig. 2 of the drawings and viewed in the direction of the arrow, the feed-chute or runway for the cans and the chute or runways for the tested cans being shown, also the irregular trackway for opening and closing the can-clamp mechanism. Fig. 4 is an enlarged broken detail top plan view of the can-carrier, disclosing three of the can-clamp mechanisms and a can in each of the seats of the can-carrier within which such mechanisms work, one of the cans being loose within its seat or unclamped, the other two cans being clamped, one of the clamped cans being partly broken away and its clamping devices sectioned. Fig. 5 is a side view in elevation of the mechanism disclosed by Fig. 4 of the drawings. Fig. 6 is a cross-sectional end view in elevation, taken on line *x x* of Fig. 5 of the drawings and viewed in the direction of the smaller arrow. Fig. 7 is a rear view in elevation, partly broken away, disclosing the air-distributer and the disk rotatably mounted thereon, the air passage-ways for the air being shown and one of the flexible-tube connections being illustrated. Fig. 8 is an end view, partly in section, of the mechanism illustrated by Fig. 7 of the drawings. Fig. 9 is a cross-section top plan view of the grooved trackway, taken on line *a a* of Fig. 3 of the drawings; and Fig. 10 is a similar view taken on line *b b* of Fig. 3 of the drawings.

The numeral 1 is used to designate any suitable form of supporting-frame, to which is secured the stationary cross-shaft 2. Upon the projecting end portion of said shaft is rotatably mounted the can-carrier, which in the present case comprises a wheel 3 and a circular ring 3', which are united and held apart by the cross-plates 4. These plates are located an equidistance apart, so as to provide a circumferential series of can-seats 5, into which the cans 6 are delivered during the rotation of the can-carrier by means of the can-feed chute or runway 7, located at one side of the said can-carrier. The cans 6 as delivered from the chute or runway 7 fall into one of the seats 5, being upheld until clamped within the seat by means of the curved supporting-plate 8. Said plate is arranged inside of the can-carrier a slight distance below the inner surface of the wheel's rim, Fig. 1 of the drawings. The position of the curved receiving or supporting plate 8 is such as to hold the cans within their seats as received to place their ends in line with the clamps 9 10 of each can-seat.

The can-clamps 9 10 extend, respectively, through the rim of the wheel 3 and through the circular ring 3', so as to clamp and hold the cans with their axis parallel to the shaft 2.

The can-carrier is driven from the drive-shaft 11 by means of a pinion 12, illustrated by dotted lines in Fig. 2 of the drawings, which pinion is attached to the inner end of the said drive-shaft and meshes with a gear-ring 13, secured to the periphery of the wheel 3 of the can-carrier, Fig. 1 of the drawings. The drive-shaft 11 works in bearings 14 of the frame 1 and is driven by any suitable means, preferably by means of a power-belt (not shown) working over a pulley attached to the outer end portion of the said drive-shaft.

The stem 9' of the can-clamp 9 extends through the wheel 3 of the can-carrier and is stationary or immovable, although each stem is formed with a central passage-way 14', which by means of a flexible tube 15 connects with an air-distributer 16, as hereinafter explained. To make a tight joint or air-tight seal between the open mouth or end 17 of the cans 6 to be tested, each clamp 9 is provided with an elastic gasket or cushion $9^2$, against which the open end of the can is forced as clamped within its seat.

The clamps 10 are movable ones, the stem 10' of each working through the ring 3', opposing the rim of the wheel 3 of the can-carrier. The outer end of each stem 10' is connected by a link 18 to the crank 19, which cranks are fulcrumed to the brackets 20, formed integral with the said ring 3'. Through each of these cranks extend a vertically-movable rod 21, the outer end of each carrying a roll 22. These rolls during the rotation of the can-carrier work within the outward and inward inclines 23 23' of the grooved curved trackway $23^2$, Fig. 3 of the drawings, which curved trackway is arranged at one side of the machine outside of the face of the ring 3' of the can-carrier. The trackway $23^2$ near its bottom is also formed with the outward inclines 24 24', which inclines are so positioned as to throw the cranks 19 to move the clamp 10 away from the can 6 in order to release the same as the cans are brought opposite the respective runways 25 25' for the reception of the imperfect and the perfect cans, as will be hereinafter fully explained.

To the inner face of the frame 1, preferably, is attached a tester-tank 26, which is disposed below the can-carrier and adapted to contain liquid in which the lower portion of the can-carrier and cans carried thereby may be immersed during rotation of the said can-carrier.

The air-distributer 16 consists of a circular hollow hub fixed to the shaft 2, upon which hub rotates the disk 26'. This disk is driven by the movement or rotation of the can-carrier, being connected thereto in any suitable manner. Into the hub or air-distributer leads the air-supply pipe 27, which is connected with a pressure-pump or air-compressor. (Not shown.) Said supply-pipe communicates with an air-chamber 27', formed in said hub, which chamber registers successively with the series of air-passages 28, formed within the rotatable disk 26'. With each air-passage 28 connects a tubular extension 28', which extensions project radially from the periphery of the disk 26', Figs. 1, 7, and 8 of the drawings. To each extension is attached one end of a flexible tube 15, the opposite end of which is connected to a tubular extension 29, depending from each clamp-stem 9', which extensions communicate with the interior passage-way 14 of the said stems. As thus connected air under pressure enters the clamped cans 6 the moment the air-passages 28 of the disk 26' register with the air-chamber of the air-distributer 16, which are brought into registry successively during rotation of the can-carrier after the cans have been clamped within the seats 5.

The supporting-plate 8 and the trackway $23^2$ are supported and held in position by means of the bracket 30, projecting from the shaft 2.

During the operation of the apparatus the cans 6 are delivered into the seats 5 of the can-carrier from the inclined feed-chute 7 by gravity during the travel of the roll 22 within the outward incline 23 of the grooved trackway $23^2$, the can being temporarily supported within the seat 5 of the can-carrier by means of the supporting-plate 8. As the can-carrier continues its rotation the roll 22 moves within the inwardly-inclined portion 23' of the trackway $23^2$, which gradually turns the crank 19, so as to force the clamp-stem 10' inward and cause the clamp 10 to move the can onto the clamp 9 and to firmly hold the can within its seat between the clamps 9 10. The can as thus clamped is carried by the rotary traveling can-carrier into the tester-tank 26 for immersion within the liquid bath contained therein. During the travel of the clamped can toward the tester-bath air under pressure is admitted into the held can, as before explained. Should the can happen to be a leaky or imperfect one, this fact will be indicated to the person having charge of the machine by the bubbles caused by the air escaping from within the submerged can. In such case the person in charge depresses or forces downward the rod 21 of the clamp mechanism for such can, so that as the clamped can is carried out of the tester-bath the lower end of the said rod 21 will bear against the outward incline 24 and cause the crank 19 to swing or turn outward, thereby moving the clamp 10 away from the can and releasing the same. The incline 24 is below the plane of the incline 24'. Hence to engage with such incline 24 it is required that the rod 21 be slightly depressed in order that its lower end will be in line with the said incline 24. By the time the clamp mechanism for said imperfect or defective can has been opened the can will be directly opposite the discharge-runway 25 for the defective cans, and the said can will be forced from its seat 5 into such runway by means of an ejector attached to and working through the lower portion of the support 8. This ejector consists of a fulcrumed lever 30, to the outer end of which is attached the weight 30'. The inner end of said lever bears against the under face of the hinged ejector-arm 31, which arm bears against the face of the can 6 and is thrown downward to force the can from its seat by the weighted rod or lever 30. The downward movement of the hinged ejector-arm is limited by the stop 32, against which the extension 32' of the arm bears when the said arm has moved downward its full distance. Unless the can 6 has been released the pressure of the fulcrumed arm exerted thereon will have no effect, but the arm will ride thereover in the same manner as an ordinary pawl.

Should the can immersed within and carried through the tester-bath prove to be a perfect or non-leaky one, then the position of the rod 21 is left undisturbed. The lower end of such rod will then be above and clear of the incline 24, so that the can 6 will be held clamped within its seat until carried past the discharge runway or chute 25 for the leaky or imperfect cans. However, as the can approaches the upper discharge chute or runway 25' for the perfect cans the lower projecting end of the rod 21 will impinge against the incline 24' and during the travel of the rotary can-carrier gradually throw the crank 19 to move the clamp-head 10 to open the clamp mechanism, so as to gradually release the can within its seat. By the time the held can has been fully released the same will be positioned directly opposite the discharge chute or runway 25' for the perfect or non-leaky cans, and the can will be forced, by means of an ejector, from within its seat into the said discharge chute or runway 25'. The ejector for thus automatically discharging the tested can into the chute or runway 25' corresponds with the ejector for the leaky or imperfect cans, it consisting of a fulcrumed lever 33, having a weight 33' secured to its outer end. The inner end of said lever bears against the under face of the hinged ejector-arm 34, which arm in turn rests against the face of the can 6. This arm is thrown downward by the weight of the lever 33, the downward movement of the arm 34 being limited by the stop 34', against which the extension 35 of the arm strikes when the arm has moved downward its full distance. As the can at such time is resting loosely within its seat, but little pressure is required to eject the same therefrom into the runway or chute 25'.

In order to permit of cans of varying diameter to be received into the seats of the can-carrier, each seat is provided with an adjustable gage-plate 35'. The stem 36 of such plate works through an opening 36' in each cross-plate 4 of the can-carrier and is held in adjusted position by means of a set-screw 37. By adjusting the gage-plate 35' toward or from its supporting-plate the size of the can-seats 5 is increased or decreased accordingly. The plate 35' is so adjusted as to place the open mouth of the can 6 in axial alinement with the opening of the fixed clamp 9.

Having thus described the invention, what is claimed as new, and desired to be protected by Letters Patent, is—

1. In a can-tester, the combination of a can-carrier rotatable in a vertical plane, of a circumferential series of can-seats in the periphery thereof, of means for imparting rotation to the carrier, a chute or runway for delivering cans to be tested into the can-seats of the carrier, clamping mechanism within each can-seat, means for supplying air under pressure into the clamped cans through one of the clamps of the clamping mechanism, a crank for moving the opposing clamp toward and from the can, a roll carried by said crank, a trackway within which said roll travels during a portion of the carrier's rotation, outward and inward inclines in the upper portion of said trackway within which the roll works to control the movement of the said crank, a vertically-movable rod working through the cranks, a tester-tank disposed below the can-carrier and into which the carrier dips to submerge the clamped cans carried thereby, inclines in the lower portion of the trackway with which the lower end of the vertically-movable rod engages to release the clamped can in accordance as to whether the can tested is a leaky or a perfect can, and means for automatically ejecting the released can during movement of the can-carrier.

2. In a can-tester, the combination with the rotatable can-carrier, of a circumferential series of can-seats in the periphery thereof, of means for automatically clamping the cans to be tested within their seats, mechanism for supplying air under pressure to the interior of the clamped cans, a tester-tank disposed below the can-carrier and into which the same dips to submerge the cans carried thereby, devices for releasing the clamping means as carried from within the tester-tank, discharge-chutes for the leaky and perfect cans, and weight-actuated ejector means for automatically ejecting the released cans into their respective chutes in accordance as to whether the tested can is a leaky, or a perfect one.

3. The combination with the rotatable can-carrier, of a circumferential series of can-seats therein, means within the seats for clamping the cans to be tested, a tester-tank disposed below the carrier and into which the same dips to submerge the cans carried thereby, devices for automatically operating the clamp mechanism to clamp the cans to be tested and to release the cans after having been tested, discharge-chutes into which the tested cans are received, and weight-actuated means for forcibly ejecting the tested cans from within their seats.

4. In a can-tester of the described character, the combination with a rotatable can-carrier, of a circumferential series of can-seats therein, a movable and a stationary can-clamp within each can-seat, an air-distributer, an air-supply pipe connected therewith, a disk rotatably mounted upon the air-distributer, a series of air-passages through the rotatable disk, said passages communicating successively with an outlet within the distributer for the air, a flexible-tube connection between each air-passage of the rotatable disk and the fixed clamp of each can-seat, each fixed clamp having a passage-way through which air is admitted into the clamped can, means for automatically actuating the movable can-clamp to clamp the can within its seat and release the same after having been tested, and devices for forcibly ejecting the tested can from within its seat.

In witness whereof I have hereunto set my hand.

HENRY C. BLACK.

Witnesses:
N. A. ACKER,
D. B. RICHARDS.